United States Patent

[11] 3,566,949

| [72] | Inventors | Hans Schieber<br>2270 W. Logan Blvd.;<br>Paul Bindel, 3946 W. North Ave., Chicago, Ill. 60647 |
|---|---|---|
| [21] | Appl. No. | 804,811 |
| [22] | Filed | Mar. 6, 1969 |
| [45] | Patented | Mar. 2, 1971 |

[54] TIRE-TRACTION CHAIN
7 Claims, 14 Drawing Figs.

[52] U.S. Cl. .................................................. 152/237
[51] Int. Cl. ...................................................... B60c 27/20
[50] Field of Search ........................................... 152/237, 236, 233

[56] References Cited
UNITED STATES PATENTS

| 2,998,835 | 9/1961 | DiFonzo | 152/236 |
| 3,149,657 | 9/1964 | Mays | 152/236 |

*Primary Examiner*—James B. Marbert
*Attorney*—Rummler and Snow

ABSTRACT: A traction chain for automobiles, trucks, etc., whereby the ends of which have oppositely extending connectors attached to the vehicle wheel rim on diametrically opposed sides thereof and to clamping members on the rim of said wheel.

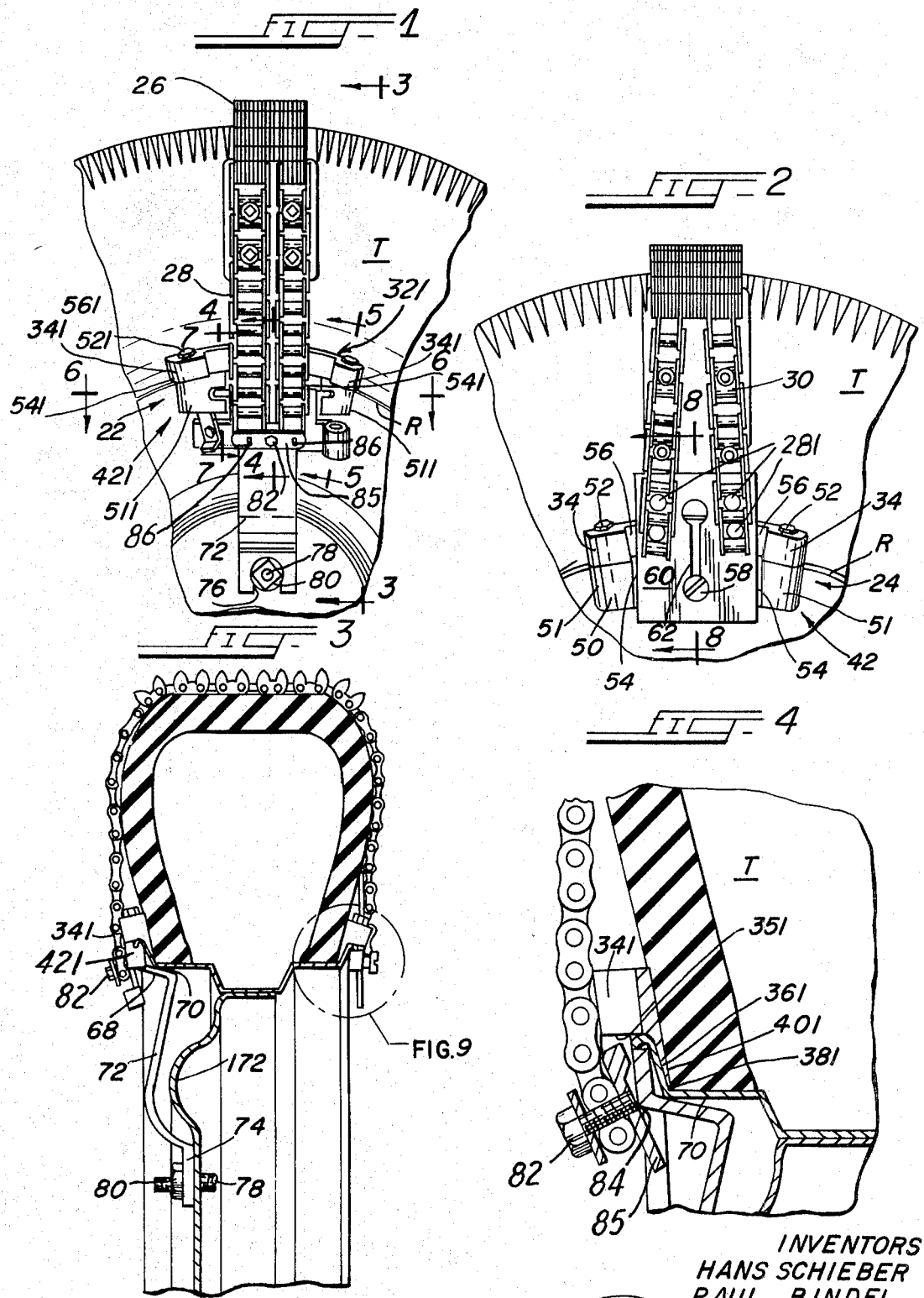

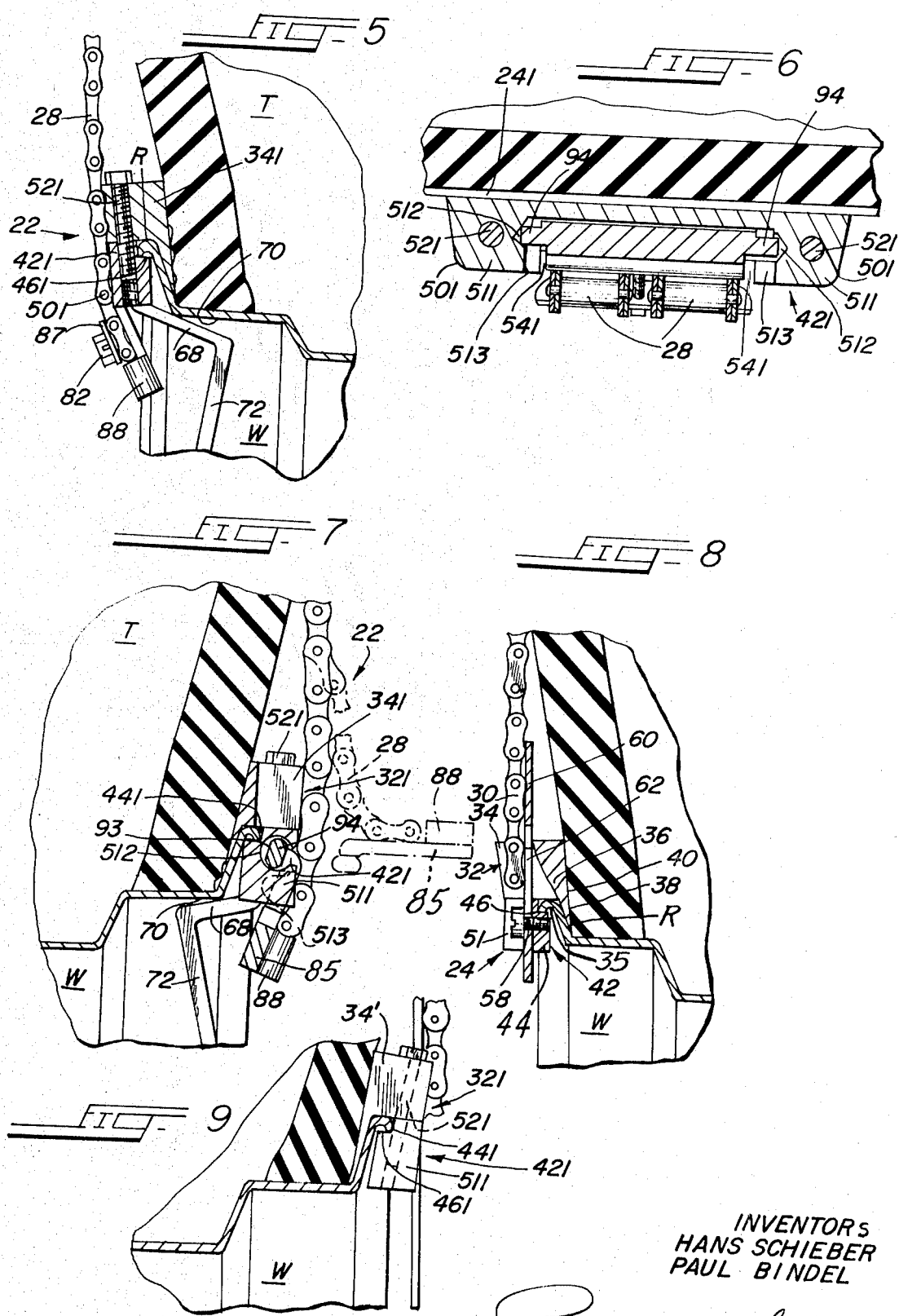

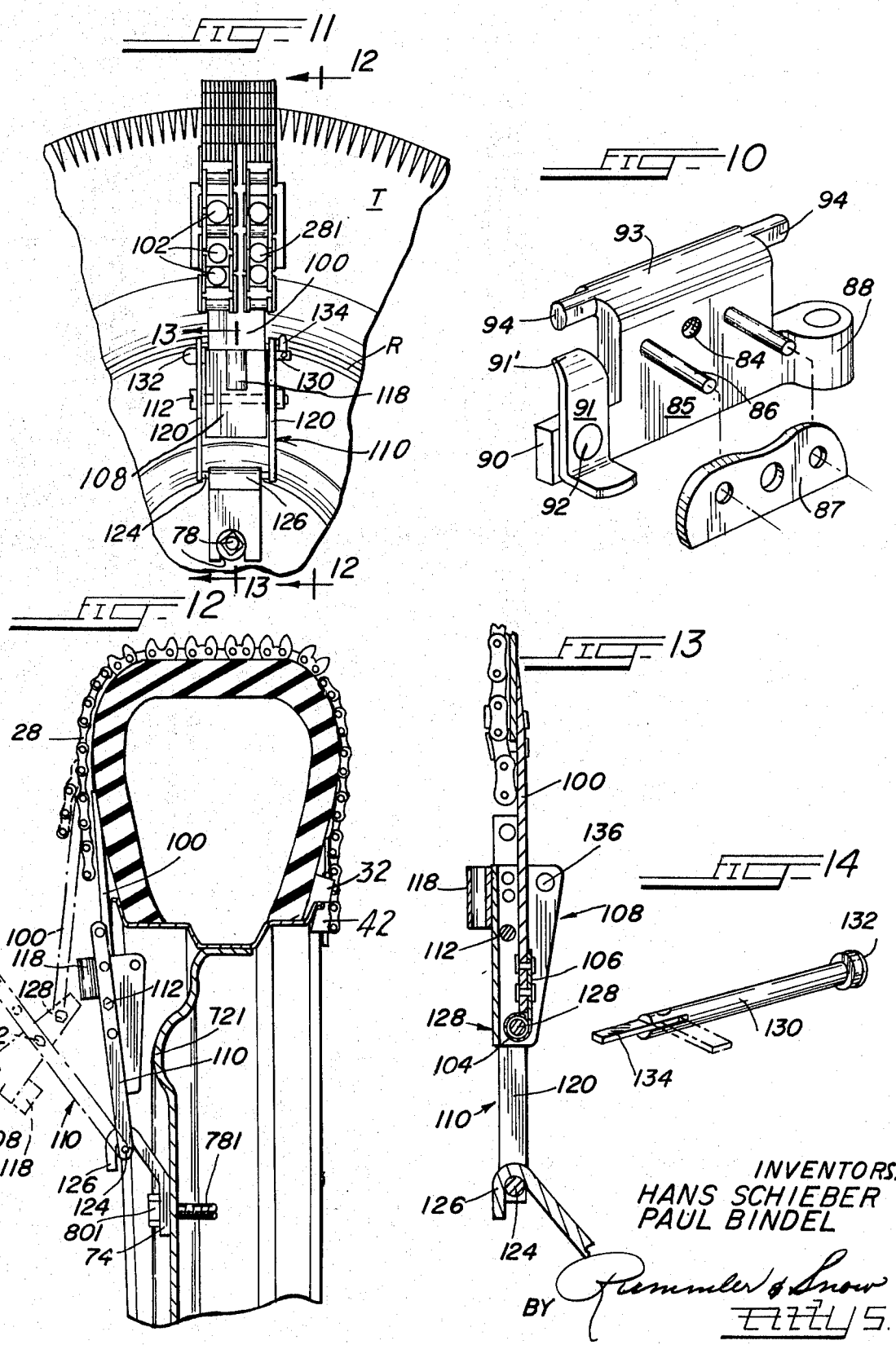

TIRE-TRACTION CHAIN

PRIOR ART

Applicants are the owners of U.S. Pat. Nos. 2,955,634 granted Oct. 11, 1960; 3,064,703 granted Nov. 20, 1962; 3,133,582 granted May 19, 1964, and 3,208,498 granted Sept. 28, 1965, all on traction devices for vehicle tires. The present invention is an improvement on the connector elements.

BRIEF SUMMARY OF INVENTION

To provide a traction chain for vehicle tires which is simple and easy to place on or take off a tire; to provide and utilize the tire rim to mount and clamp and to accomplish ready placement and removal of a traction chain; to provide a locking mechanism in the form of toggle latches for the tire chain, to provide a cooperating pin and keyhole slot latch for the inner side of the tire and wheel for easy placement and displacement of the chain on the rear of the tire; to provide an improved tire traction device wherein the connector elements are structured for quick positioning in opposed relationship to the opposite faces of a vehicle wheel with a tread chain embracing the tire preparatory for swinging the toggle latch parts into position to releasably tension the tread chains over the tire; to provide a simple latching mechanism on the front face of the tire rim to securely latch the traction chain to the tire.

BRIEF DESCRIPTION OF THE DRAWING

FIG. 1 is a fragmentary elevational view of the front side of a vehicle tire and wheel and showing the front latching device of the present invention in locked position;

FIG. 2 is a fragmentary elevational view of the rear side of a vehicle tire and wheel showing the rear latching device thereon in locked position;

FIGS. 3, 4, 5, 6 and 7 are cross-sectional views taken on the lines 3–3, 4–4, 5–5, 6–6 and 7–7, respectively, of FIG. 1;

FIG. 8 is a cross-sectional view taken on the lines 8–8 of FIG. 2;

FIG. 9 is an enlarged section taken within the circle shown in FIG. 3;

FIG. 10 is a perspective view of front latching plate only;

FIG. 11 is a fragmentary front elevational view of a slightly modified type of the front latching device;

FIG. 12 is a cross-sectional view taken on the lines 12–12 of FIG. 11; also showing in phantom outline the position of the toggle joint prior to locking the connector unit;

FIG. 13 is a cross-sectional view taken on the lines 13–13 of FIG. 11; and

FIG. 14 is a perspective view of the latch pin.

DETAILED DESCRIPTION

The device of the present invention comprises tread chain 20 and front and rear connector elements 22 and 24 respectively.

The tread chain 20 may be of almost any conventional wide type involving a middle section between a pair of end sections 28 and 30. The form herein is substantially similar to those shown in my hereinabove mentioned patents. In each such tread chain, the middle section 26 is made up of multiple rows and of a length to extend beyond the circumferential edges of the tread section of the tire T. The end sections 28 and 30 are lengths of conventional sprocket chains, the opposite free ends of which are attached, respectively, to the hereinafter described components that constitute the connector elements 22 and 24.

It is these connector elements 22 and 24 and associated clamping structures that constitute the improvements over my aforesaid patented inventions.

The rear connector 24 of the two embodiments shown in the drawings are identical in structure. The rim clamp thereof comprises an elongated upper section 32 having a pair of integrally formed identical bosses 34 adjacent each end of the upper section 32. (See FIG. 2). Each of the bosses are provided with a transverse aperture therein. The inner face of the section 32 as viewed in FIG. 8 of the drawings has a flat downwardly extending transverse apronlike portion 36 while the outer face is tapered downwardly terminating in a blunt edge 38 (See FIGS. 3 and 8) whereby to be readily insertable and seat between the lower end of the wall 40 of the tire T and in the inner peripheral margin of the rim R of wheel W with a portion of the bottom wall 35 of the bosses 34 seating on the upper peripheral margin of the rim R. The blunt end 36 of the apron is convex-shaped to substantially conform to the curvature of the rim R.

The lower section 42 of rear connector 24 is of a length substantially equal to that of the upper section 32 and is designed to cooperate therewith to form a tight clamping joint about the margin of the rim R.

It comprises an elongated main portion having a longitudinal offset 44 on the upper rear edge thereof whereby the upper face of the bottom wall 46 thereof, when positioned in cooperative relationship with the upper section 32 will lie under and bear against the lower peripheral margin of the rim (See FIG. 8).

The lower section 42 is also provided with a pair of spaced bosses 51 similar to the bosses 34 and each of which have a transverse threaded aperture 50. The apertures 50 cooperate with and are aligned with the apertures in the bosses 34 whereby when the bolts 52 draw the upper and lower sections together then form latching engagement with the rim R of the wheel W.

The lower section 42 is also provided with an elongated recess 54, extending between the bosses 51 and is cooperatively aligned with recess 56 formed by the bosses 34 when the rear connector unit 24 is latched to the rim of the wheel W.

A headed pin 58 or machine screw is provided in the recess 54, medially of longitudinal and transverse axis of the lower section 42.

The free end of the rear section 30 of the chain is provided with a plate 60 having a vertically extending bayonet slot 62 therein, medially of the side edges of the plate 60, for the reception of the headed pin 58 and to latch the rear section of the chain to the rear connector unit, (See FIGS. 2 and 3) by inserting the circular opening of the keyhole slot 62 over the head of pin 58 and on to the shank 59 of the pin and moving the chain upwardly around the crown of the tire. It is to be noted that the plate 60 lies in the recesses 54 and 56.

The upper section 321 of the front connector 22 is identical to the upper section 32 of the rear connector unit 24 in all details and a detailed description thereof is believed redundant. The same numerals are used to identify identical parts for clarity.

The lower section 421 of front connector 22 is of a length and width substantially equal to that of the upper section 321 and is designed to cooperate therewith to form a tight joint about the margin of the rim R diametrically opposed to the rear connector 24 as mounted on the tire rim.

It comprises an elongated main portion having a longitudinal recess 441 on the upper rear edge thereof whereby the bottom wall 46 thereon when positioned in cooperative relationship with the upper section 321 will lie under and bear against the underside of the rim wall (See FIGS. 5, 6 and 7).

The lower section 421 is provided with a pair of spaced bosses 511 similar to the bosses 341 of the upper section each of which have a transverse threaded aperture 501. The apertures 501 cooperate and are aligned with the apertures in the bosses 341 whereby when the bolts 521 draw the upper and lower sections together they form clamping engagement with the rim R of the wheel W.

The lower section is also provided with an elongated recess 541 (See FIG. 6) extending between the spaced bosses 511 and is cooperatively aligned with recess formed by the spaced bosses 341 when the front connector unit 22 is clamped to the rim of the wheel W.

The bosses 511 are each provided with a longitudinal slot or bore 512 extending inwardly from the inner wall of each boss 511 a short distance. Each of the front walls of the boss 511 are provided with an opening 513 have a length of about the length of the bore 512 but having a width of about three-fourths of the inside diameter of the bore 512 (See FIGS. 6 and 7).

A leg 72, integrally formed on and a part of the bottom wall of the lower section 421 extends inwardly toward wheel W and downwardly toward the axis of the wheel and further contoured to conform to the shape wheel portion below the rim R (see FIG. 3). Thus the portion 68 extends inwardly below and contacts the surface 70 of the wheel. From this point it is bent radially to pass over the bulge 172 in the wheel W, and terminating in a vertically disposed plate 74. This plate 74 is provided with a vertically extending open ended slot 76 for insertion over the usual threaded stud 78 and solidly anchored thereto by nut 80. Thus the lower section 421 is solidly held against the lower wall 70 of the wheel by the additional support of the leg 68.

The lower end of the chain section 28 is secured to the inverted L-shaped-latching plate (See FIG. 11) by a headed bolt 82 extending between the pair of sprocket chains 28 and anchored in an appropriate threaded aperture 84 in the central portion of the main body 85. On both sides of the aperture 84 a pair of upstanding pintles 86 are anchored, which extend thru one of the lower links of each of the sprocket chains 28. An elongated washer 87 is provided with three spaced apertures. The pintles 86 extend thru the two outer apertures and the screw or bolt 82 extends thru the medial aperture thus when the machine screw is anchored in the threaded aperture 84 the inverted L-shaped plate is anchored to the lower end of the chain 28.

The lower end of the sidewall of the latching plate as seen in FIG. 10 is provided with an integrally formed offset socket 88. The opposed sidewall is provided with an integrally formed plate 90 on which a latch plate 91 is rotatably secured by a loose rivet 92. The purpose of the socket 88 and latch bar will hereinafter be explained.

The upper rear portion of main body 82 as viewed in FIG. 10 is provided with an integrally formed rearwardly extending offset portion 93 with the major portion of the rear edge being rounded, and provided with pins 94 extending outwardly from each end of the offset 93.

The pins are substantially rectangular shape.

The latch the connector to the lower section 421 the plate 85 is turned horizontally as shown in dotted outline in FIG. 7, and the pins 94 inserted into the openings 513 and into the bore 512, whereby the plate is rotated downwardly with the pins 94 positioned in the respective bores 512 acting as the pivot. A jack rod or other suitable rod, (not shown) has one end inserted in the socket 88 and downward pressure on the rod will cause the plate 85 to move over center as shown in FIGS. 3, 5 and 7. Now the latch plate 91 is rotated manually to seat the free end 91 thereof into an appropriate slot 95 in the bottom wall of the boss 511.

In FIG. 11 to 14 we have shown a modified form of front connector. The rear connector is identical to that of FIGS. 2, 3 and 8 hence will not be redescribed here.

The front connector comprises an elongated link bar 100, preferably in the form of a flat metal strip, secured at one end to the lower end of the chain section 281 by means of a plurality of rivets 102 to make the bar 100 a part of the chain 281. The free end of bar 100 is provided with an offset eye or closed clip 104 having an extension 106 riveted to the bar (see FIG. 13).

The toggle latch comprises two parts 108 and 110. The two parts are connected together by a hinge pin 112 and mounts a tool socket 118. The part 108 here is shown as a trapezium-shaped stamping of U-shaped cross section, which is hinged at 128 to the free end of the link bar 100.

The part 110 comprises a pair of spaced flat strips 120 secured adjacent their opposite ends to the hinge pin 112 and to a rod 124 respectively. The rod 124 is adapted for seating in the clip 126, the opposite end of which is anchored to the tire wheel lug 781 by the nut 801. The socket 118 is a section of tubing, which is welded to the outer end of the base of the U-shaped latch part 108.

The locking pin 130, see FIG. 14, with a head 132 and a pivoted detent 134, is structured for insertion through aligned holes 136 (FIG. 13), in the upper extremities of the parallel sides of the U-shaped latch part 108, as shown in FIG. 12. This will position the pin 33 inwardly of the link bar 100 and ensure retention of the toggle parts 108 and 110 in position for retaining the tread chain in functioning position on the tire T.

To use the traction device, the upper and lower sections 32 and 42 are positioned on the rim of the tire as hereinbefore disclosed, and the clip 126 is anchored to the tire lug 781. The keyhole slot 62 in plate 60 is now placed on the pin 58 and positioned. The balance of the traction chain is placed over the treads of the tire and the rod 124 placed in the clip 126.

A jack rod is now inserted into the socket 118 and rotated outwardly and upwardly and the toggle parts 108—110 will rotate about the pivots 112 and 124 until the toggle parts 108—110 assume the position shown in full lines in FIG. 13. The latch pin 130 is inserted thru the opposed apertures 136 and the pintle 134 rotated to a position transverse to the pin axis to prevent accidental displacement of the pin and also lock the toggle parts 108—110 together. The jack bar is removed and the traction chain will be ready for use.

When the traction chain device is to be removed, the detent 134 is positioned in alignment with the pin 130 to permit withdrawal of the pin 130 from the holes 136. Thereupon, with an appropriate rod inserted into the socket 118 the toggle latch parts 108 and 110 may be retracted to the position shown in phantom in FIG. 13, to permit the removal of the rod 124 from the clip 126. The tread chain then may be thrown back over the tire T to permit the removal of the plate from the slot 62. The resulting disconnection will allow the traction device to be removed from the tire.

It should be obvious that the plates 60 may be adjusted vertically on chains 28 to fit different sizes of tires by shifting the bolts 281 higher or lower on the chains by insertions between the links.

Also, the toggle latching member 108 is provided with opposed spaced apertures in the sidewalls, see FIG. 12, whereby the pin 112 may be shifted to other apertures whereby the chain may be accommodated to different size tires.

We claim:

1. A tire traction device comprising in combination with a motor vehicle wheel including a tire, a wheel having a rim and a wheel lug;

a. tread chain having end sections on each of the free ends of said tread chain;

b. a pair of two part clamping members each removably attached to the rim of a motor vehicle wheel in opposed relationship, one on the front side of the wheel rim and one on the rear side thereof, each of said pair of clamping members including an upper section and a lower section, said front lower section having means anchored to said tire lug to prevent displacement of said sections from said tire rim; and c. latching means on the free end of each said end sections to lock said tread chain to said respective clamping members.

2. The device according to claim 1 wherein said upper and lower clamping sections each have a pair of bosses, the bosses in the upper section having transverse apertures therethrough and the bosses on the lower section having threaded apertures therein, the apertures in the upper and lower sections being in alignment, a screw extending thru each of the bosses for clamping the two sections together.

3. The device according to claim 2 wherein the upper sections are provided with an integrally formed, downwardly extending triangularlike apron for insertion between the inner edge of the tire rim and the lower sidewall of the tire.

4. The device according to claim 3 wherein the lower section of the rear clamp is provided with a headed pin, and one of said latching means comprises an elongated plate having a keyhole slot positioned medially therein for reception of said headed pin to secure one side of said traction device to said vehicle rim.

5. The device according to claim 4 wherein each of the bosses on said front lower section has a bore and a slot communicating therewith.

6. The device of claim 5 wherein the latching means on the free end of said other section is anchored to an inverted L-shaped plate, said plate having integral pins extending outwardly from the upper edges of said plate for latching engagement in said bores, an offset socket on side end of said plate and an outwardly projecting ear on the side opposed to said socket having a rotatable locking plate thereon to secure said plate and tire chain in operative position on said tire.

7. The device according to claim 5 wherein the latching means on the free end of said other section is an elongated bar having one end attached to said section, a pair of toggles comprising a pair of links, one comprising a trapezium-shaped stamping of U-shaped cross section pivoted at its apex to the free end of said bar, the second link pivotally attached at one end, adjacent the base of said first link, a clip anchored at one end to the lug of the wheel and at the other end pivotally anchoring the free end of said second link, a socket on said first link adjacent the base thereof for shifting the links to secure the latching means and tire chain in operative position, and means to lock said links in operative position.